Figures 1, 2:
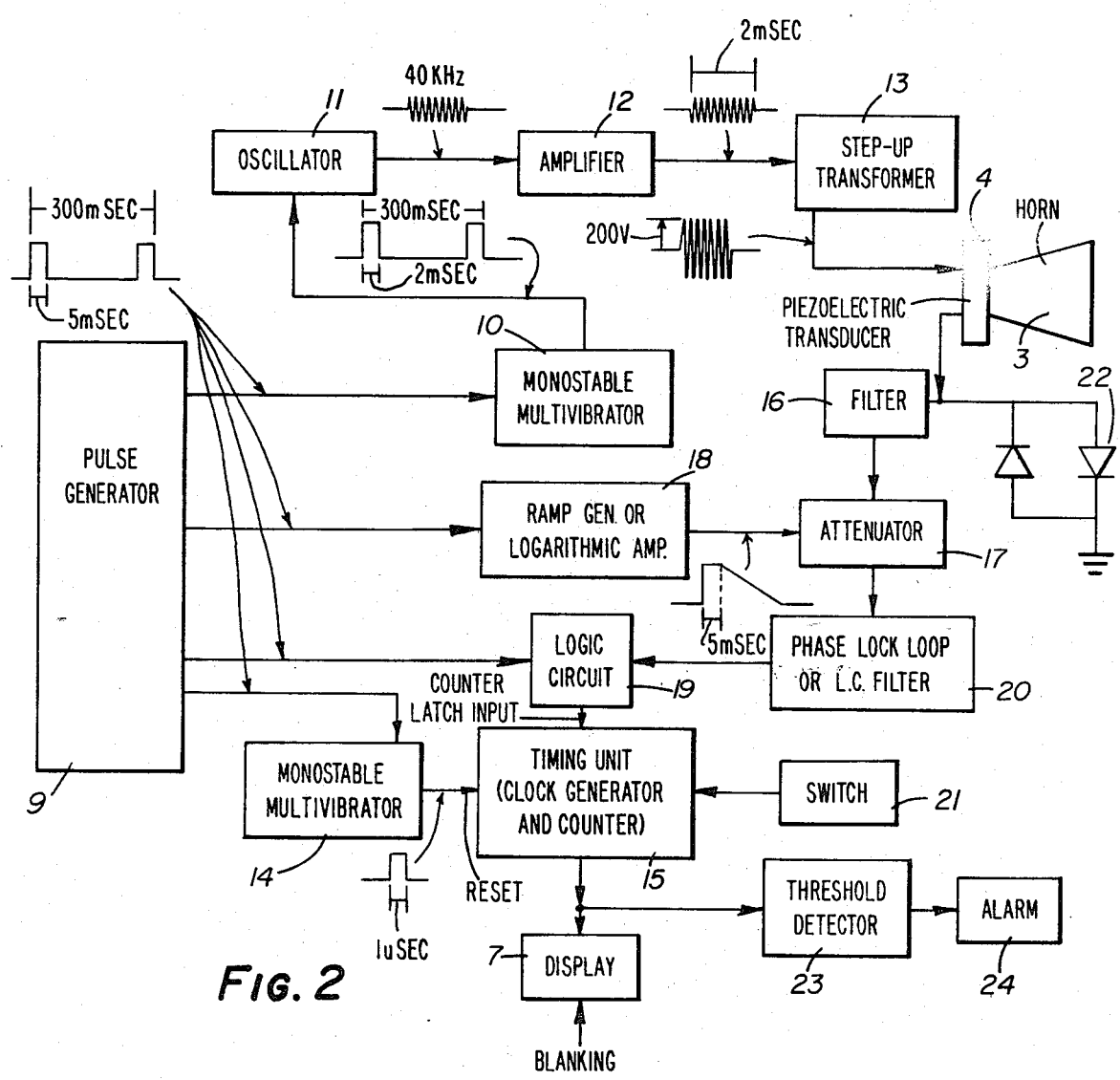

United States Patent [19]

Czajkowski

[11] Patent Number: 4,464,738

[45] Date of Patent: Aug. 7, 1984

[54] SONAR DISTANCE SENSING APPARATUS

[75] Inventor: Stanislaw B. Czajkowski, London, England

[73] Assignee: Sonic Tape Public Limited Company, London, England

[21] Appl. No.: 314,090

[22] PCT Filed: Feb. 23, 1981

[86] PCT No.: PCT/GB81/00025

§ 371 Date: Oct. 20, 1981

§ 102(e) Date: Oct. 20, 1981

[87] PCT Pub. No.: WO81/02472

PCT Pub. Date: Sep. 3, 1981

[30] Foreign Application Priority Data

Feb. 22, 1980 [GB] United Kingdom ............... 80 06161

[51] Int. Cl.³ .................... G01S 15/14; G01S 7/52
[52] U.S. Cl. ................... 367/97; 367/108; 367/112; 367/900; 367/103
[58] Field of Search ............ 367/97, 108, 112, 114, 367/116, 900, 87, 99, 103, 151, 152

[56] References Cited

U.S. PATENT DOCUMENTS

| | | | |
|---|---|---|---|
| 2,998,591 | 8/1961 | Lovett | 367/116 |
| 3,234,502 | 2/1966 | Sicuranza | 367/112 |
| 3,372,576 | 3/1968 | Dory | 367/108 X |
| 3,588,795 | 6/1971 | Linardos et al. | 367/108 |
| 3,624,596 | 11/1971 | Dickenson et al. | 367/900 X |
| 3,696,326 | 10/1972 | McAlpin | 367/108 |
| 3,733,582 | 5/1973 | Eck et al. | 367/108 X |
| 3,787,803 | 1/1974 | Beebe | 367/98 X |
| 4,200,921 | 4/1980 | Buckley | 367/97 X |

FOREIGN PATENT DOCUMENTS 2515087 10/1976 Fed. Rep. of Germany ...... 367/108

Primary Examiner—Richard A. Farley
Attorney, Agent, or Firm—Kenyon & Kenyon

[57] ABSTRACT

A distance sensing apparatus is provided in the form of a case housing electronic equipment including a piezoelectric transducer for radiating pulsed sonic or ultrasonic signals along a measurement path through a sound horn (3) which creates a narrow beam. Reflected signals received back through the horn are received by the transducer and converted into electric measurement signals. A time measurement device is providing for determining the time lapse between radiation of a pulse and receipt of a reflected signal so as to provide a distance signal which will be representative of the path distance between the apparatus and the surface which will trigger a display (7) to give a distance reading. An important feature of the apparatus is that the electronic circuitry will include an amplifier which will increase the amplification of the electrical signals carried by a reflected pulse at a function of time lapsed from the radiation of a measurement signal pulse so as to compensate for the attenuation of the received signal.

11 Claims, 2 Drawing Figures

SONAR DISTANCE SENSING APPARATUS

The invention relates to a distance sensing apparatus.

There is a need for a device which is simple to use for sensing when an object is within a predetermined distance, for example, as an aide when reversing large lorries. There is also a need for a device which can sense the distance to an object rapidly and provide an indication of this distance, for example, when measuring the dimensions of a room. The present invention seeks to provide apparatus for carrying out such functions.

According to the invention there is provided distance sensing apparatus comprising a generator for radiating pulsed sonic or ultrasonic measurement signals along a measurement path, a receiver for converting into electrical signals reflections of measurement signals from a remote surface back along the measurement path, a time measurement device for determining the time lapse between radiation of a measurement signal pulse and receipt of a reflected signal, thereby to provide a distance signal which will be representative of the path distance between the apparatus and said surface, and an amplifier for increasing the amplification of said electrical signal as a function of the time elapsed from radiation of a measurement signal pulse.

By including the amplifier for increasing the amplification as a function of time elapsed from the radiation of a measurement signal pulse the apparatus is compensated for the attenuation, of the reflected sonic or ultrasonic signal, which increases with path distance between the generator and the remote surface.

Display means will ideally be provided that is responsive to the distance signal and is calibrated in distance markings to provide a direct indication of the path distance. The distance can then be determined rapidly by reading the display.

In the preferred embodiment the generator comprises a transducer which is responsive to exciting means and ideally this transducer also acts as the receiver for reflected signals. A piezoelectric transducer is preferred. Where the apparatus is to be used for measuring substantial distances (say 30 meters or more) it is great advantage to provide a sound lens or sound horn adjacent to the generator to create a narrow directional beam sonic or ultrasonic signal. Such a feature is particularly suitable for use with a piezoelectric transducer so that distance measurement of up to 50 to 60 meters is possible with a fair degree of certainty and the device can still be made to operate well beyond that range. For long range purposes it is desirable to restrict the projection angle of the beam by means of the sound lens or the sound horn to about 3° or less. If the apparatus is to be used for measuring nearby objects then a narrow projection angle is not necessary and thus a sound lens or sound horn producing a projection angle of up to 20° (with respect to the axis of projection) or more may be suitable for these cases.

The apparatus will preferably include display means responsive to the distance signal which is calibrated to provide a direct indication of said path distance. In this case the time measurement device may include a counter arranged to count pulses from a clock generator in the interval between radiation and reception of a measurement signal pulse, which pulse is arranged to drive the display means. It is preferred that there should also be means for blanking the counter display during radiation of a burst of measurement signal and to retain the display in the blanked condition in the absence of a distance signal. The apparatus can also carry a viewing device enabling the apparatus to be aimed at an object whose distance is to be sensed.

The means for increasing the amplification of the electrical signal as a function of time can be provided by an attenuator connected in series with the amplifier together with means for reducing the attenuation of the attenuator as a function of time elapsed from the radiation of a measurement signal pulse. The attenuator can be an electronic attentuator connected for control by a voltage derived from a voltage ramp generator or a logarithmic amplifier which is initiated by the measurement signal generator.

Ideally the amplifier will be a selective amplifier arranged to amplify signals at the transducer radiation frequency. Ideally the apparatus will include a phase lock loop or an LC filter coupled with the output of the amplifier so as to lock upon receipt of a reflected signal pulse at the radiation frequency and to provide an arresting signal for the time measurement device.

Apart from merely providing a display of the elapsed time there could be an indicator responsive to the distance signal and arranged to provide an alarm indication when a predetermined signal value occurs so as to indicate the presence of a surface at or within a predetermined range.

The invention may be performed in various ways and a preferred embodiment thereof will now be described with reference to the drawing, in which:

FIG. 1 shows a distance measuring apparatus constructed in accordance with the invention and illustrates schematically the passage of a radiated emission between the apparatus and a remote surface; and FIG. 2 is a block circuit diagram of the operational parts of the apparatus of FIG. 1.

Referring now to FIG. 1, the distance measuring apparatus comprises a case 1 which is small enough to be carried easily and which has a recess 2 at one end; from which extends a conical horn 3. In the base of the recess there is located a piesoelectric ultrasonic transducer 4 which can be excited by an exciter within the case to emit pulses of ultrasonic radiation. The horn 3 serves to define the field of projection of the transducer which is arranged in this particular case to define a projection angle of 3° with respect to the horn axis 5. Ultrasonic energy radiated from the transducer can be directed at a surface 6 and, as can be seen from FIG. 1, only radiation which is reflected back within the projection angle reaches the transducer 4. In practice this is almost exclusively energy which follows the axis 5. This energy traverses the shortest possible reflection path and the time interval between radiation of a pulse of ultrasonic energy from the transducer 4 and its reception by the transducer after reflection from the surface 6 is a function of the distance between transducer 4 and surface 6. The time interval is assessed by circuitry in the case, and a digital indication of distance, which is related to the time interval, is provided directly on a digital display 7 provided on the casing. The case 1 also has a viewer 8 mounted on the top whereby the user is able to point the apparatus accurately in the desired direction and thus avoid possible reflections from objects other than the one whose distance is to be measured.

The circuitry for determining the travel time of a reflected pulse and producing an indication on the display 7 is illustrated diagrammatically in FIG. 2. The circuit includes a low frequency pulse generator 9 providing a pulse of 5n sec duration with a duty signal of 300 m secs. One output of the pulse generator is connected to a monostable multi-vibrator 10 which, when triggered, will provide pulses of 2 m sec duration. These pulses are coupled to the input of oscillator 11. The oscillator is capable of adjustment and in this instance will be set to produce oscillations at a frequency of 40 KHz. The pulses from the monostable multi-vibrator 10 serve to control the generation of the 40 KHz signal from the oscillator 11 so as to provide an output signal from an amplifier 12 in the form of 2 m sec bursts of a 40 KHz signal. The signal from the amplifier 12 is supplied to the primary winding of a step-up transformer 13. The secondary winding of the transformer provides a pulsed 200 volt burst and is series-connected with the ultrasonic piezoelectric transducer 4.

A further output from the pulse generator 9 is connected to a monostable multi-vibrator 14 which produces a 1 μsec pulse which acts as a resetting pulse for a timing unit 15 which incorporates a counter. This initiates a timing count sequence.

The same transducer 4 is employed for transmission and reception of ultrasonic signals. This is achieved by taking the receiver input across a pair of diodes 22 connected in parallel and in reverse configuration and ensuring that the signal developed across the diodes during the period of a transmission pulse does not exceed a voltage of approximately 0.7 V peak. Signals produced by excitation of the transducer 4 due to a reflected pulse are fed through a filter 16 to an electronic attenuator 17. The filter acts to filter out unwanted frequencies.

The ramp generator 18 is initiated to provide, in response to each pulse from the pulse generator 9, a voltage which causes the attenuator 17 to provide a large attenuation of the received signal which is maintained for the 5 m.sec. duration of the pulse, this voltage reducing after the expiry of the pulse, as a ramp function with time to reduce gradually the attenuation of the signal. The reason for having a 5 m.sec maximum attenuation period and a 2 m.sec transmission burst is because there are small reflections and parasitic oscillations near the trailing edge and all these are then substantially reduced by the attenuator. In this way, any received signal developed during a transmission pulse is greatly attenuated and the attenuation is reduced with time after the 5 m.sec transmission pulse so that attenuation of the received signal which results from propagation losses in passage between the transducer and a reflecting object are substantially compensated. The ramp generator 18 is provided with variable resistors for adjusting the ramp height and decay time respectively in order to adapt the apparatus for particular modes of operation. These are preset for a particular application.

In order to provide a digital indication of the time period between radiation of an ultrasonic signal pulse and receipt of the pulse by the transducer 4, the timing unit 15 incorporates a clock generator which continuously generates clock pulses which are fed to a digital counter. The counter has a latch input which is actuated by a logic circuit 19 (as hereinafter described) and is opened in response to a pulse from the output of pulse generator 9, which signifies radiation of an ultrasonic measurement burst. The latch is closed upon receipt of a pulse from a phase lock loop 20 (or an LC filter) which signifies receipt of a reflected measurement pulse by the transducer 4. In this way a pulse count representative of the time period between emission and reception of a burst by the transducer is produced. It will be appreciated that this time period is a function of the distance travelled by the ultrasonic signal. The counter in the timing unit 15 is reset, at the same time as the signal pulse is transmitted, by means of the reset signal from the monostable multivibrator 14. The count is indicated directly on a four character seven segment display unit 7. By appropriate choice of the clock generator frequency the display can be arranged to provide a direct indication of the distance of a reflecting object from the transducer in units of for example feet or meters. In the embodiment described a switch 21 is provided which alters the frequency of the clock generator to indicate distance selectively in feet or in meters but it will be appreciated that by appropriate choice of clock frequency the distance can be indicated in different units e.g. yards. If no pulse is received from the phase lock loop 20 prior to the next pulse from the pulse generator 9, the display 7 is blanked. This means that if no reflection occurs because there is no object within range then the display remains blank.

The entire apparatus operates at 9 v, which may be supplied by a battery, and draws approximately 14 MA with the display blanked off and approximately 34 MA when the display is on.

Since the distance measuring apparatus according to the invention has a time gain control, it is possible to amplify a signal by a predetermined fixed gain which changes with respect to time. For example, when measuring a wall six feet away, the amplifier circuit gives an overall signal gain of 6; smaller objects are equally given an amplification of 6 but because of their size in relation to the wall, the signal is nowhere near sufficient to trigger the phase lock loop. At, say, thirty feet, owing to the time gain control, the gain increase is one hundred and fifty times. Even though the amplifier has increased in gain, small far objects still do not produce a signal large enough to trigger the phase lock loop. Only a large reflective surface will give the necessary return pulse sufficient to trigger the phase lock loop.

A particular advantage of the apparatus according to the invention is that it is possible to recover the reflected signal from the transmitting transducer without loss due to the switching employed.

It will be appreciated that various alternatives to or modifications of features described in the described embodiment are possible without departing from the scope of the invention. Thus, instead of exciting the transducer repetitively it could be excited to radiate a single burst of radiation as required. The excitation may be manually instead of electrically induced. Although ultrasonic frequencies are preferred sonic frequencies could be employed. Instead of a phase lock loop on an LC filter, a tone decoder responsive to the particular sonic or ultrasonic frequency could be employed. A logarithmic amplifier may be used instead of the ramp generator to give signals or equal weighting regardless of strength of the received signal.

Instead of a digital display an analogue display may be employed. A display can be dispensed with completely if a signal representative of path distance is required for controlling some other piece of equipment e.g. an alarm such as alarm 24, or a display can be provided in addition to a control function. It will be appreciated that a threshold detector 23 could be arranged to be triggered by the signal representative of path distance to indicate that an object is within a predetermined range. Such an arrangement would find application in for example the reversing of vehicles; detection of obstructions by vehicles travelling in fog or detection of vehicles entering a confined space e.g. ships entering a harbour.

Other possible uses are to measure distances which would normally be measured by a measuring tape, e.g. the dimensions of a room, the height of a ceiling or height of a vehicle.

I claim:

1. Distance sensing apparatus comprising a measurement signal generator including exciting means for generating pulsed electrical signals and a transducer responsive to the exciting means for radiating pulsed sonic or ultrasonic measurement signals along a measurement path, said transducer also receiving and converting into return electrical signals reflections of said measurement signals from a remote surface back along the measurement path, a time measurement device for determining the time lapse between radiation of a measurement signal pulse and receipt of a reflected signal, thereby to provide a distance signal which will be representative of the path distance between the apparatus and said surface, an amplifier for increasing the amplification of said return electrical signals as a function of the time elapsed from radiation of a measurement signal pulse, said amplifier including an attenuator and means coupled to said attenuator for reducing the attenuation of the attenuator as a function of time elapsed from the radiation of a measurement signal pulse and a sound lens or sound horn provided adjacent to the transducer to create a narrow directional beam sonic or ultrasonic signal, said beam having a projection angle of about 3° or less.

2. Apparatus according to claim 1, wherein the transducer is a piezoelectric transducer.

3. Apparatus according to claim 1, including display means responsive to the distance signal which is calibrated to provide a direct indication of said path distance.

4. Apparatus according to claim 3, including a counter arranged to count pulses from a clock generator in the interval between radiation and reception of a measurement signal pulse, which pulse count is arranged to drive the display means.

5. Apparatus according to claim 3, including means for blanking the display means during radiation of a burst of measurement signal and to retain the display means in the blanked condition in the absence of a distance signal.

6. Apparatus according to claim 1, wherein the transducer is connected in series with a pair of diodes which are connected in parallel opposition, so that the electrical signal will be developed across the diodes.

7. Apparatus according to claim 1, wherein the amplifier is a selective amplifier arranged to amplify signals at the transducer radiation frequency.

8. Apparatus according to claim 1, including a phase lock loop or an LC filter coupled with the output of the amplifier so as to lock upon receipt of a reflected signal pulse at the radiation frequency and to provide an arresting signal for the time measurement device.

9. Apparatus according to claim 1, including an indicator responsive to the distance signal and arranged to provide an alarm indication when a predetermined signal value occurs so as to indicate the presence of a surface at or within a predetermined range.

10. Apparatus according to claim 1, including a viewing device enabling the apparatus to be aimed at an object whose distance is to be sensed.

11. Apparatus according to claim 1, wherein said reducing means comprises a voltage ramp generator or a logarithmic amplifier which is initiated by said measurement signal generator.

* * * * *